US012596350B2

(12) United States Patent
Tiew et al.

(10) Patent No.: US 12,596,350 B2
(45) Date of Patent: Apr. 7, 2026

(54) LINEAR ACTUATOR BUCKLING FORCE CONTROL

(71) Applicant: Halliburton Energy Services, Inc., Houston, TX (US)

(72) Inventors: Hock Soon Tiew, Singapore (SG); Simon Whye Kwong Wai, Singapore (SG); Kar Ki Andrew Loh, Singapore (SG); How Jiun Irvin Yuen, Singapore (SG)

(73) Assignee: Halliburton Energy Services, Inc., Houston, TX (US)

( * ) Notice: Subject to any disclaimer, the term of this patent is extended or adjusted under 35 U.S.C. 154(b) by 404 days.

(21) Appl. No.: 18/213,774

(22) Filed: Jun. 23, 2023

(65) Prior Publication Data

US 2024/0427311 A1 Dec. 26, 2024

(51) Int. Cl.
G05B 19/4155 (2006.01)
E21B 44/02 (2006.01)

(52) U.S. Cl.
CPC .......... G05B 19/4155 (2013.01); E21B 44/02 (2013.01); G05B 2219/41337 (2013.01)

(58) Field of Classification Search
None
See application file for complete search history.

(56) References Cited

U.S. PATENT DOCUMENTS

| | | | |
|---|---|---|---|
| 4,382,381 A | 5/1983 | Soeiinah | |
| 4,384,483 A | 5/1983 | Dellinger et al. | |
| 5,398,462 A | 3/1995 | Berlin et al. | |
| 2001/0022238 A1 | 9/2001 | Houwelingen et al. | |
| 2016/0251954 A1* | 9/2016 | Samuel ................... E21B 44/00 | |
| 2018/0038163 A1 | 2/2018 | Kartha et al. | |
| 2018/0065533 A1 | 3/2018 | Hertog | |
| 2024/0150161 A1* | 5/2024 | Nyström ............... B60P 1/6463 | |

OTHER PUBLICATIONS

International Search Report and Written Opinion for International Patent Application No. PCT/US2023/027877 dated Mar. 15, 2024. PDF file. 8 pages.

* cited by examiner

*Primary Examiner* — Ryan A Jarrett
(74) *Attorney, Agent, or Firm* — John Wustenberg; C. Tumey Law Group PLLC

(57) ABSTRACT

A method for controlling a stroker actuator, that includes measuring a piston extension length, calculating a piston buckling threshold based on the piston extension length, measuring a piston force, making a determination that the piston force exceeds the piston buckling threshold, and based on the determination, shortening the piston extension length.

20 Claims, 6 Drawing Sheets

INFORMATION
HANDLING
SYSTEM *200*

402

402

402

LINEAR ACTUATOR BUCKLING FORCE CONTROL

BACKGROUND

For oil and gas exploration and production, a network of wells, installations and other conduits may be established by connecting sections of metal pipe together. For example, a well installation may be completed, in part, by lowering multiple sections of metal pipe (i.e., a drillstring) into a wellbore, and drilling towards a targeted area.

Towards the downhole end of the drillstring, there may be a linear actuator that forcefully extends a piston which pushes (anything attached to the piston) further into the well. Such an actuator may be a "stroker" actuator that recipro-cates the piston back-and-forth to repeatedly impact an object and/or obstruction in the well.

When extended, the piston of the linear actuator is uncon-strained in lateral directions. Consequently, one problem with linear actuators, generally, is that the piston may buckle (i.e., deform laterally away from the axis of translation) when the compressive forces placed on the piston surpass a critical threshold—the "buckling load".

Traditionally, the buckling load of a piston is calculated via Euler's critical load formula (or Johnson's parabolic formula) using some combination of (i) the Young's modu-lus of the piston's material, (ii) the length of the piston when fully extended, and (iii) the distal constraints of the piston. Then, in order to prevent buckling of an actuator piston, the maximum load applied to the piston is limited to that calculated buckling load.

BRIEF DESCRIPTION OF DRAWINGS

These drawings illustrate certain aspects of some examples of the present disclosure and should not be used to limit or define the disclosure.

DETAILED DESCRIPTION

Overview and Advantages

In general, this application discloses one or more embodi-ments of methods and systems for dynamically analyzing and controlling a stroker actuator (an actuator on a drill-string) in order to prevent buckling of the actuator piston. Specifically, a maximum allowable force (before buckling) may be dynamically calculated based on (i) the material strength of the piston, (ii) a measured (or calculated) force strength of the piston, (ii) a measured (or calculated) force applied to the piston, and (iii) a measured (or calculated) length of the exposed portion of the piston. Thus, instead of a single maximum force limiting utilization of the actuator in all configurations, different maximum forces may be calculated (for a single actuator) based on intermediate extension lengths of the piston (i.e., when the piston is partially extended).

As an example, a steel piston (with a given diameter) may buckle when exerting 10,000 pounds of force when fully extended at 20 inches. Accordingly, in traditional systems, the force on the piston may be limited to 10,000 pounds in all cases. However, using the methods and systems disclosed herein, that same piston may be able to exert up to 45,000 pounds of force (before buckling) when only partially extended (e.g., at 10 inches). Thus, the same actuator and piston can be used at higher forces when the piston length is decreased, without risk of buckling. In such a scenario, the limiting factor of the force exerted by the actuator may be the internal mechanism of the actuator (e.g., the piston threads, the power collar, the pressure capacity of the actuator body, etc.).

FIG. 1

Figure 1:
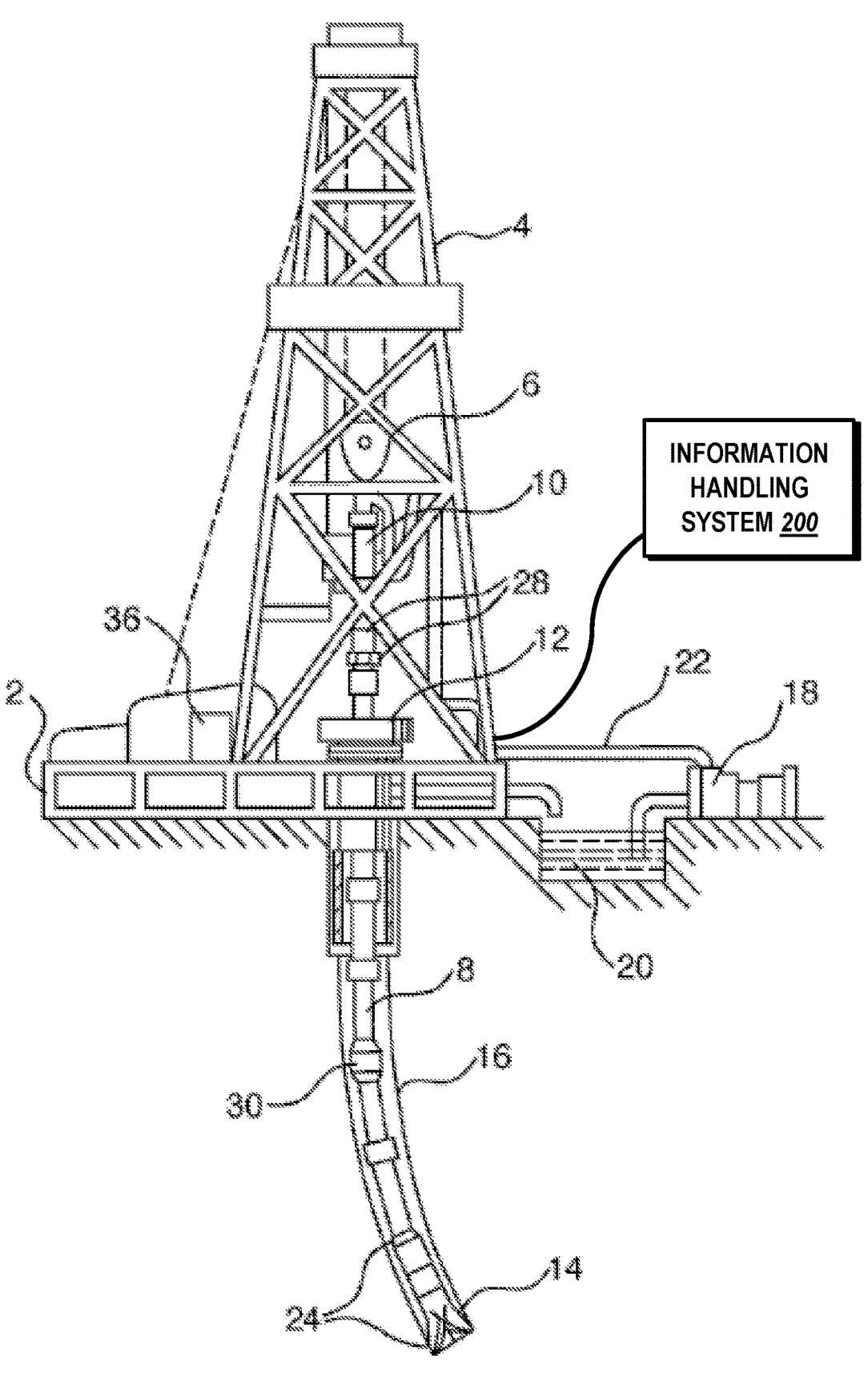
FIG. 1 is a diagram of one or more aspects of a drilling environment.

FIG. 1 is a diagram of one or more aspects of a drilling environment. Drilling platform 2 supports derrick 4 having a traveling block 6 for raising and lowering drillstring 8. Top drive 10 supports and rotates drillstring 8 as it is lowered through wellhead 12. Drill bit 14 is driven by a downhole motor and/or rotation of drillstring 8. As bit 14 rotates, it creates wellbore 16 that passes through various strata of the subterranean formation. Pump 18 circulates drilling fluid 20 through feed pipe 22, through the interior of drillstring 8 to drill bit 14. The fluid exits through orifices in drill bit 14 and flows upward through the annulus around drillstring 8 to transport drill cuttings to the surface, where the fluid is filtered and recirculated.

Drill bit 14 is just one piece of bottom-hole assembly 24 that includes a mud motor and one or more "drill collars" (thick-walled steel pipes) that provide weight and rigidity to aid the drilling process. In one or more embodiments, bottom-hole assembly 24 may include a telemetry sub to maintain a communications link with the surface. Mud pulse telemetry may be one common telemetry technique for transferring tool measurement data to surface receivers and receiving commands from the surface, but other telemetry techniques can also be used. As a non-limiting example, a technique for transferring tool measurement data to the surface and receiving commands from the surface may include through-wall acoustic signaling, wherein drillstring 8 may include one or more repeater(s) 30 to detect, amplify, and re-transmit signals both from the bottom of wellbore 16 to the surface, and from the surface to bottom-hole assembly 24. At the surface, transducers 28 may convert signals between mechanical and electrical form, enabling network interface module 36 to receive the uplink signal from the telemetry sub and transmit a downlink signal to the telem-etry sub.

Information handling system 200 may be operatively connected to drillstring 8 (and/or other various components of the drilling environment). Information handling system 200 may receive a digital telemetry signal, demodulate the signal, and display the tool data or well logs to a user. Information handling system 200 may process the signals, and the information contained therein may be displayed for an operator to observe and stored for future processing and reference. Alternatively, signals may be processed downhole prior to receipt by information handling system 200. Although FIG. 1 depicts information handling system 200 as being hardwired to one or more components of the drilling environment, it should be appreciated that information handling system 200 may utilize wireless communications.

Software may govern the operation of information handling system 200. A user, for example a driller, may interact with information handling system 200 (e.g., via one or more input device(s) 222 and software executing on information handling system 200). A user may utilize information handling system 200 to employ action(s) (e.g., activating stroker actuator 402) by communicating appropriate commands to the bottom-hole assembly 24 to execute those decisions. Information handling system 200 may be operable to perform calculations or operations to evaluate a formation, identify formation boundary positions, and/or control stroker actuator 402 as further described herein.

In any embodiment, one or more tools may be connected to the end of drillstring 8 at bottom-hole assembly 24. As non-limiting examples, a shifting tool (and a shifting key thereof), drill bit 14, a suspension tool, and/or any other field joint 320 may be placed at or near the deepest downhole portion of drillstring 8. Any one (or combination) of these components may be placed after stroker actuator 402.

FIG. 2A

Figure 2A:
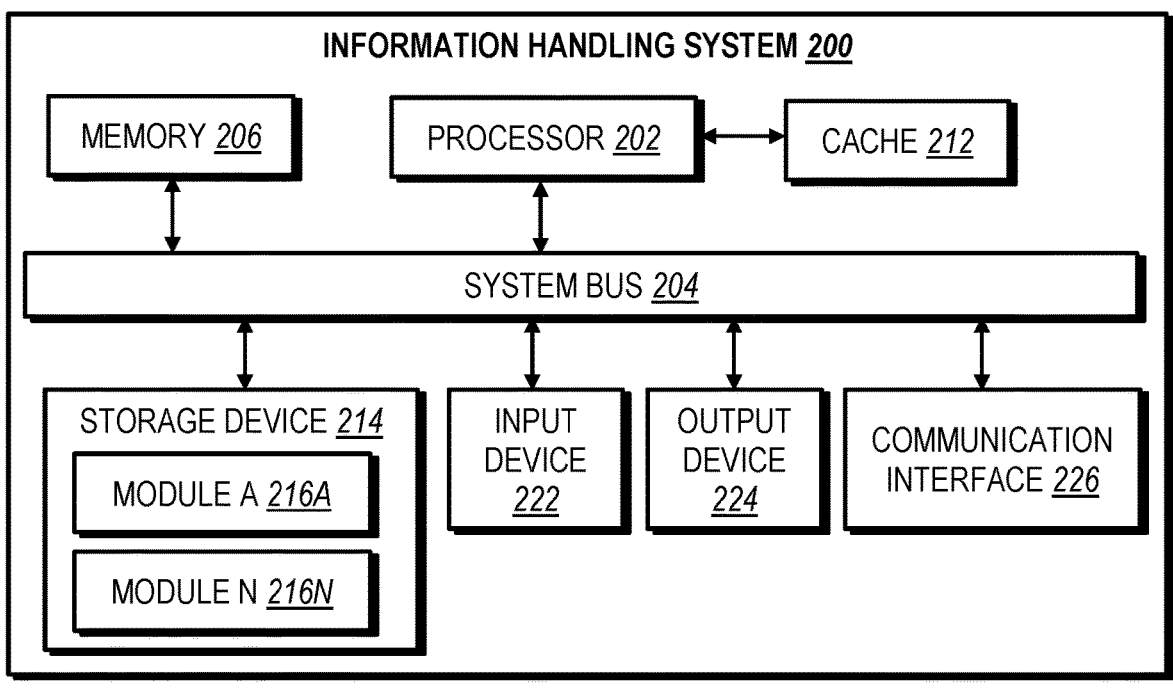
FIG. 2A is a diagram of an example information handling system.

FIG. 2A is a diagram of an example information handling system which may be utilized to perform various steps, methods, and techniques disclosed herein. As illustrated, information handling system 200 includes processor 202 and system bus 204 that operatively connects processor 202 to one or more other component(s) of information handling system 200. Other components of information handling system 200 may include (i) memory 206, (ii) storage device 214, (iii) input device 222, (iv) output device 224, and (v) communication interface 226. These other components may control or be configured to control processor 202 to perform various operations or actions. Each component described is depicted and disclosed as individual functional components. However, these individual components may be combined (or divided) into fewer (or more) components in any possible combination or configuration.

Non-limiting examples of information handling system 200 include a general purpose computer (e.g., a personal computer, desktop, laptop, tablet, smart phone, etc.), a network device (e.g., switch, router, multi-layer switch, etc.), a server (e.g., a blade-server in a blade-server chassis, a rack server in a rack, etc.), a controller (e.g., a programmable logic controller (PLC)), and/or any other type of information handling system 200 with the aforementioned capabilities. Further, information handling system 200 may be operatively connected to another information handling system 200 via a network in a distributed computing environment.

Processor 202 is an integrated circuit configured to process computer-executable instructions (e.g., code, algorithms, software) and may take the form of any general-purpose processor (e.g., a central processing unit (CPU)). Processor 202 may execute (e.g., read and process) computer-executable instructions stored on storage device 214, memory 206, and/or cache 212. Processor 202 may be a self-contained computing system, containing multiple cores or processors, a bus, memory controller, cache, etc. Processor 202 may include multiple processors, such as a system having multiple, physically separate processors in different sockets, or a system having multiple processor cores on a single physical chip. A multi-core processor may be symmetric or asymmetric. Further, processor 202 may include multiple distributed processors located in multiple separate computing devices but configured to operate together via a communications network. Multiple processors or processor cores may share resources such as memory 206 or cache 212 or may operate using independent resources.

Non-limiting examples of processor 202 include one or more state machines, an application specific integrated circuit (ASIC), a programmable gate array (PGA), a field PGA (FPGA), a digital signal processor (DSP), or any other digital or analog circuitry configured to interpret, execute program instructions, process data, or any combination thereof. Processor 202 may logically include a hardware or software module (e.g., software module A 216A and/or software module N 216N stored in storage device 214), which is configured to control processor 202 as well as a special-purpose processor where software instructions are incorporated into processor 202.

Processor 202 may execute one or more instruction(s) for processing one or more measurement(s) according to any one or more algorithm(s), function(s), or calculation(s) discussed below. It may be appreciated that the disclosure may operate on information handling system 200 with more than one processor 202 or on a group of information handling systems 200 networked together to provide greater processing capability. The logical operations performed by processor 202 may implemented as (i) a sequence of computer implemented steps, operations, or procedures running on a programmable circuit within a general use computer, (ii) a sequence of computer implemented steps, operations, or procedures running on a specific-use programmable circuit, and/or (iii) interconnected machine modules or program engines within the programmable circuits.

Information handling system 200 may execute some or all of the recited methods, may be a part of the recited systems, and/or may operate according to instructions in the recited tangible computer-readable storage devices. Such logical operations may be implemented as modules configured to control processor 202 to perform particular functions according to the programming of software modules 216A and 216N.

Cache 212 is one or more hardware device(s) capable of storing digital information (e.g., data) in a non-transitory medium. Cache 212 may be considered "high-speed", having comparatively faster read/write access than memory 206 and storage device 214, and therefore utilized by processor 202 to process data more quickly than data stored in memory 206 or storage device 214. Accordingly, information handling system 200, via processor 202, may copy data from memory 206 and/or storage device 214 to cache 212 for comparatively speedier access and processing. Processor 202 may be operatively connected to (or include) cache 212. Cache 212 expressly excludes media such as transitory waves, energy, carrier signals, electromagnetic waves, and signals per se.

Memory 206 is one or more hardware device(s) capable of storing digital information (e.g., data) in a non-transitory medium. In one or more embodiments, when accessing memory 206, software may be capable of reading and writing data at the smallest units of data normally accessible (e.g., "bytes"). Specifically, memory 206 may include a unique physical address for each byte stored thereon, thereby enabling software to access and manipulate data stored in memory 206 by directing commands to specific physical addresses that are associated with a byte of data (i.e., "random access"). Non-limiting examples of memory 206 devices include flash memory, random access memory (RAM), dynamic RAM (DRAM), static RAM (SRAM), resistive RAM (ReRAM), read-only memory (ROM), and electrically erasable programmable ROM (EEPROM). In one or more embodiments, memory 206 devices may be volatile or non-volatile. Memory 206 expressly excludes media such as transitory waves, energy, carrier signals, electromagnetic waves, and signals per se.

Storage device 214 is one or more hardware device(s) capable of storing digital information (e.g., data) in a non-transitory medium. Non-limiting examples of storage device 214 include (i) integrated circuit storage devices (e.g., a solid-state drive (SSD), Non-Volatile Memory Express (NVMe), flash memory, etc.), (ii) magnetic storage devices (e.g., a hard disk drive (HDD), floppy disk, tape, diskette, cassettes, etc.), (iii) optical media (e.g., a compact disc (CD), digital versatile disc (DVD), etc.), and (iv) printed media (e.g., barcode, quick response (QR) code, punch card, etc.). In one or more embodiments, prior to reading and/or manipulating data located in storage device 214, data may first be copied in "blocks" (instead of "bytes") to other, intermediary storage mediums (e.g., memory 206, cache 212) where the data can then be accessed in "bytes". Storage device 214 expressly excludes media such as transitory waves, energy, carrier signals, electromagnetic waves, and signals per se.

As used herein, a non-transitory computer readable medium means any (i) storage device 214, (ii) memory 206, (iii) cache 212, and/or (iv) any other hardware device capable of non-transitorily storing and/or carrying data. When data that includes computer-executable instructions are provided to information handling system 200 via communication interface 226, information handling system 200 writes that data to memory 206, storage device 214, or cache 212. Thus, the data received via communication interface 226 is therefore stored in a non-transitory computer-readable medium. Combinations of the above should also be included within the scope of the computer-readable media.

A software module (e.g., module A 216A, module N 216N) is data that includes computer-executable instructions (e.g., code, algorithms, software, program). Computer-executable instructions include, for example, instructions and data which cause information handling system 200, and/or processor 202 thereof, to perform a certain function or series of functions. Computer-executable instructions also include program modules that are executed in standalone or network environments. Generally, program modules include routines, programs, components, data structures, objects, and the functions inherent in the design of special-purpose processors. These program modules may be utilized to perform particular tasks or implement particular abstract data types. Computer-executable instructions, associated data structures, and program modules represent examples of code for executing steps of the methods disclosed herein.

Input device 222 is one or more hardware device(s) that generate and/or input data into information handling system 200 via one or more sensor(s) or reading device(s). Non-limiting examples of input device 222 include a mouse, a keyboard, a monitor, a camera, a microphone, touchpad, touchscreen, fingerprint reader, joystick, gamepad, and/or drive for reading non-transitory computer readable media (e.g., a compact disc (CD) drive, a floppy disk drive, tape drive, etc.). To enable user interaction with information handling system 200, input device 222 represents any number of input mechanisms, such as a microphone for speech, a touch-sensitive screen for gesture or graphical input, and so forth.

Output device 224 is one or more hardware device(s) that export data from information handling system 200 via peripheral device(s). Non-limiting examples of an output device 224 include a visual display monitor, speakers, printer, LED bulb (e.g., a status light), haptic feedback device, and/or drive for writing to non-transitory computer readable media (e.g., a CD drive, a floppy disk drive, tape drive, etc.).

Communication interface 226 is one or more hardware device(s) that provide the capability to send and/or receive data with one or more other information handling systems 200 via a network. Communication interface 226 may communicate via any suitable form of wired interface (e.g., Ethernet, fiber optic, serial communication etc.) and/or wireless interface (e.g., Wi-Fi® (Institute of Electrical and Electronics Engineers (IEEE) 802.11), Bluetooth® (IEEE 802.15.1), etc.) and utilize one or more protocol(s) for the transmission and receipt of data (e.g., transmission control protocol (TCP), internet protocol (IP), remote direct memory access (RDMA), etc.). Non-limiting examples of communication interface 226 include a network interface card (NIC), a modem, an Ethernet card/adapter, and a Wi-Fi® card/adapter.

System bus 204 is a system of hardware connections (e.g., sockets, ports, wiring, conductive tracings on a printed circuit board (PCB), etc.) used for sending (and receiving) data to (and from) each of the devices connected thereto. System bus 204 allows for communication via an interface and protocol (e.g., inter-integrated circuit (I2C), peripheral component interconnect (express) (PCI (e)) fabric, etc.) that is commonly recognized by the devices utilizing system bus 204. System bus 204 may be any of several types of bus structures including a memory bus or memory controller, a peripheral bus, and a local bus using any of a variety of bus architectures. As a non-limiting example, a basic input/output (BIOS) stored in ROM, may provide the basic routine that helps to transfer information between elements using system bus 204, within information handling system 200 (e.g., during initialization). Each of the previously discussed components of information handling system 200 may be operatively connected to system bus 204, in turn allowing each of those components to communicate through system bus 204.

FIG. 2B

Figure 2B:
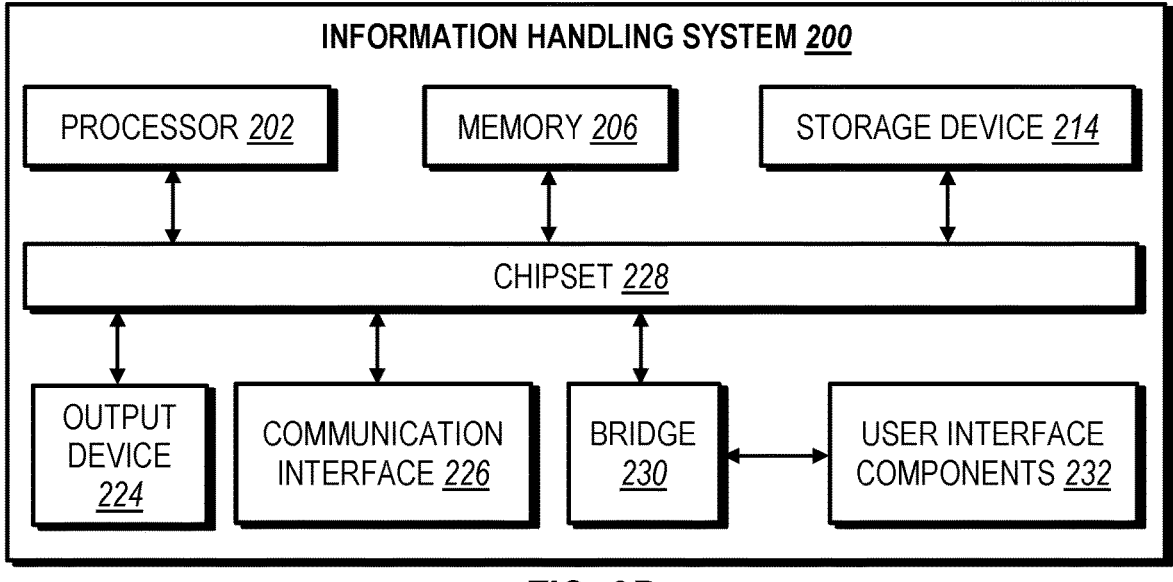
FIG. 2B is a diagram of another example information handling system.

FIG. 2B is a diagram of another example information handling system having a chipset architecture that may be used in executing a method for generating and displaying a graphical user interface (GUI). Information handling system 200 is an example of computer hardware, software, and firmware that may be used to implement the disclosed technology. Information handling system 200 may include a processor 202, representative of any number of physically and/or logically distinct resources capable of executing software, firmware, and hardware configured to perform identified computations.

Chipset 228 is one or more hardware device(s) that controls the flow of data to and from processor 202. As a non-limiting example, chipset 228 may obtain data from processor 202 (and/or cache 212 thereof) and output that data to output device 224 (e.g., a visual display monitor). Further, chipset 228 may interface with one or more communication interface(s) 226, with differing physical interfaces, to enable communication with those interfaces. As another non-limiting example, chipset 228 may receive raw data via communication interface 226, write the raw data to memory 206, send that data to processor 202 for processing, retrieve the processed data from processor 202, and then write the processed data to memory 206 and/or storage device 214.

Bridge 230 is one or more hardware device(s) that act as an interface between chipset 228 and one or more user interface component(s) 232. Non-limiting examples of user interface components 232 may include any input device 222 or output device 224 described in FIG. 2A. In general, inputs to information handling system 200 may come from any of a variety of sources-machine and/or human generated.

Some applications of the methods for generating, displaying, and using the GUI disclosed herein may include receiving ordered datasets over the physical interface. Such ordered datasets may be generated by information handling system 200 itself (e.g., by processor 202 analyzing data stored in memory 206 or storage device 214). Further, information handling system 200 may receive inputs from a user via user interface components 232 and executes corresponding functions, such as browsing functions by interpreting these inputs using processor 202.

FIG. 3

Figure 3:
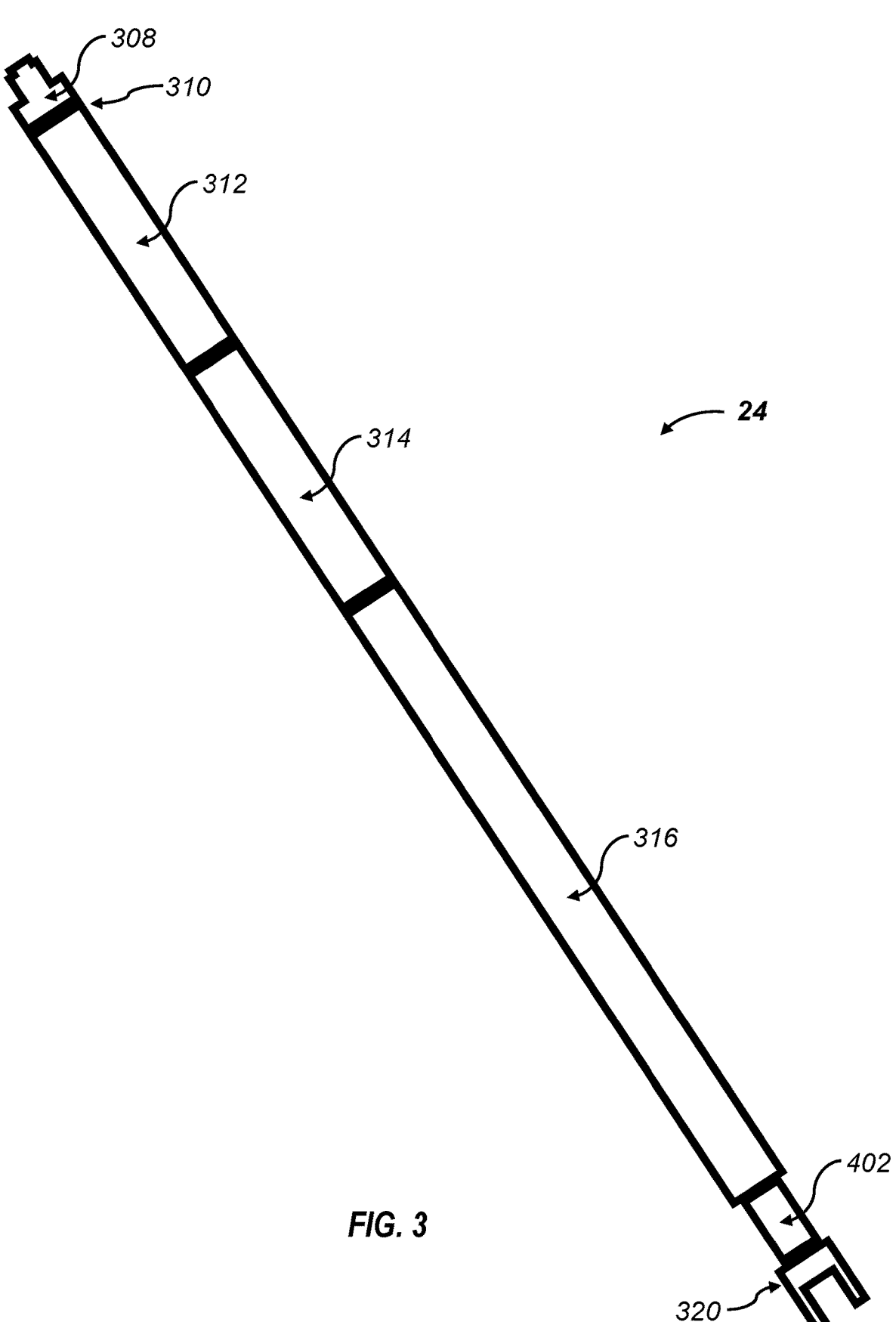
FIG. 3 is a diagram of an example bottom-hole assembly.

FIG. 3 is a diagram of an example bottom-hole assembly. Bottom-hole assembly 24 may include, as a non-limiting example, shop joint 308, hermetic connector 310, compensator section 312, piston/motor/gearbox assembly 314, thrust bearing assembly 316, stroker actuator 402, and field joint 320 (e.g., any tool used downhole). In any embodiment, stroker actuator 402 may be placed closer to the downhole distal end of the bottom-hole assembly 24 than most of the other components. In any embodiment, one or more tools may be connected to (or beyond, "after") stroker actuator 402 further downhole. As a non-limiting example, a shifting tool (and a shifting key thereof), drill bit 14, a suspension tool, and/or any other field joint 320 may be placed after stroker actuator 402 (i.e., further downhole).

Stroker actuator 402 may further include an anchoring system (not shown) that may extend (and retract) radially away from bottom-hole assembly 24 and against the walls of the wellbore. When extended, the anchoring system increases friction and/or causes mechanical locking with wellbore 16 (see description in FIG. 1) to stabilize bottom-hole assembly 24 (and stroker actuator 402 thereof). Once stabilized, any counteracting forces resulting from forces exerted by stroker actuator 402, are felt by the anchoring system (and transferred to the walls of wellbore 16). Consequently, the other components of bottom-hole assembly 24 that are up-hole from the anchoring system experience minimized counteracting forces resulting from the operation of stroker actuator 402.

FIGS. 4A-4C

Figure 4A:
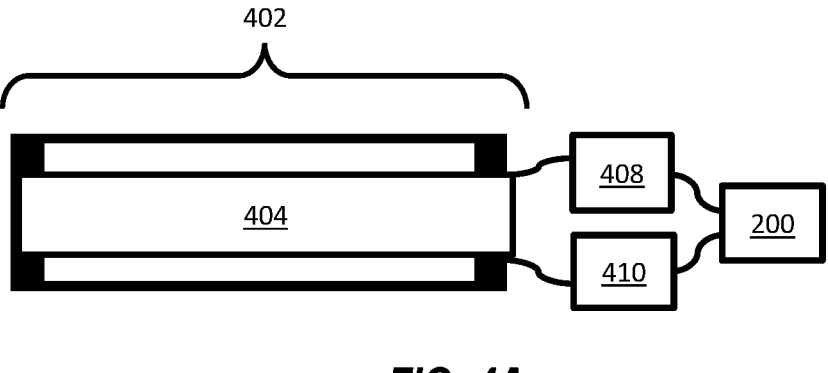
FIG. 4A is a diagram of an example retracted stroker actuator.
Figure 4B:
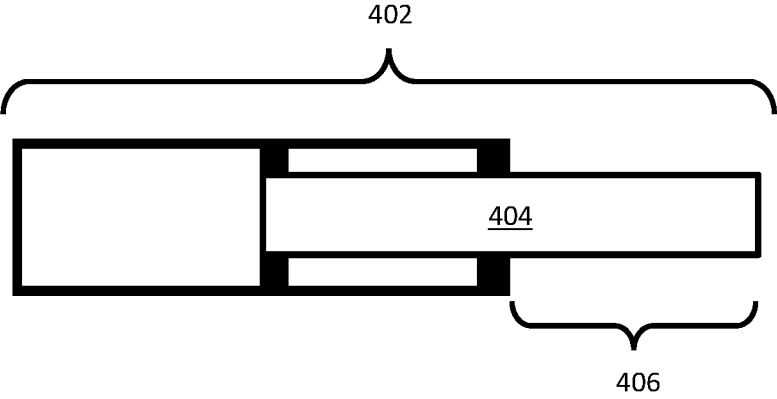
FIG. 4B is a diagram of an example partially extended stroker actuator.
Figure 4C:
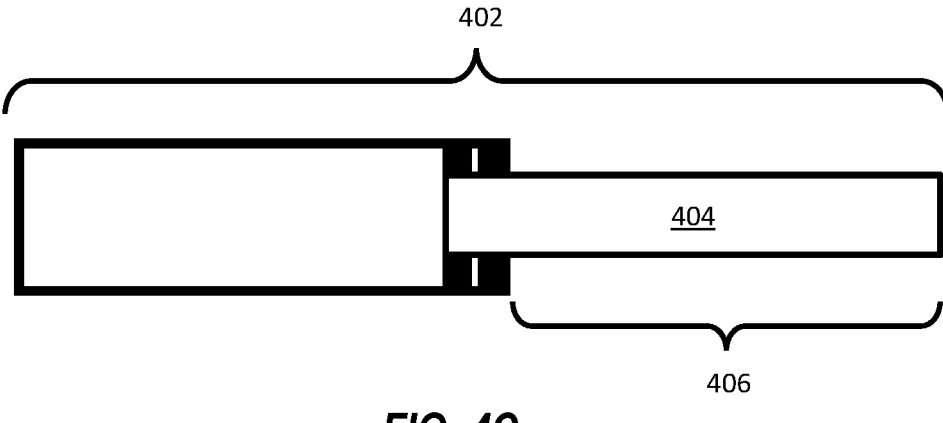
FIG. 4C is a diagram of an example fully extended stroker actuator.

FIGS. 4A, 4B, and 4C are diagrams of example of a stroker actuator with various piston extension lengths. As illustrated, stroker actuator 402 includes piston 404 that can extend and retract into the body of stroker actuator 402. Stroker actuator 402 may further include force sensor 408, distance sensor 410, and information handling system 200 operatively connected thereto. Information handling system 200 may be on the surface (as depicted in FIG. 1) and/or may be installed locally on stroker actuator 402 (or on bottom-hole assembly 24). Such sensors may be present in any embodiment but, for compactness, are only depicted in FIG. 4A.

Piston 404 may be made from any solid material (e.g., metal, plastic, wood) and may be formed based on the driving mechanism of stroker actuator 402. Information handling system 200 (see description in FIGS. 2A and 2B) may control stroker actuator 402 to extend or retract piston 404 via any number of possible driving mechanisms. As a non-limiting example, piston 404 may be smooth when controlled by hydraulics. Alternatively, the piston 404 may be threaded (e.g., a screw) so that it may be driven by a ball screw collar or a roller screw mechanism. A piston 404 may be partially smooth and partially threaded (e.g., a smooth piston 404 controlled hydraulically with an extended threaded portion, or a threaded piston controlled via a screw collar with an extended smooth portion). A person of ordinary skill in the art (provided the benefit of this detailed description) would appreciate that a piston 404 may be made in any shape, size, and material suitable for the application and driving mechanism of stroker actuator 402.

Stroker actuator 402 may be used to extend piston 404 to exert force (or otherwise place pressure) on some other object (e.g., a valve, obstruction, plug, etc.) (not shown). Further, another component may be affixed to the exposed end of piston 404, such that the affixed component is then used to impact some other object. Stroker actuator 402 may be controlled to repeatedly extend and retract piston 404 to cause piston 404 (or some attachment affixed thereon) to repeatedly impact some other object (i.e., perform a reciprocating back-and-forth motion).

Force sensor 408 may be used to measure (e.g., obtain, convert, store) data related to the force exerted by piston 404 and/or compressive force experienced by piston 404 (i.e., piston force). Non-limiting examples of force sensor 408 include a force transducer, load cell, and piezoelectric force sensor. Force sensor 408 may be installed in-line with the axial motion of piston 404. Force sensor 408 may take the form of a pressure sensor which measures the pressure of fluids inside the cavity of stroker actuator 402. Those pressure measurements may then be used to indirectly calculate the piston force. The piston force may be indirectly calculated via the properties of other components of stroker actuator 402. As a non-limiting example, a motor (not shown) may be employed to control the pumping of hydraulic fluids or the collar of a screw piston. In such cases, the current (or power) drawn by the motor may be correlated to piston force, and the piston force can be calculated from the current (or power) sensors already available in the electrical system of stroker actuator 402. Information handling system 200 may be employed to gather, store, analyze, display, manipulate and/or otherwise process any of the data obtained by force sensor 408.

Distance sensor 410 may be used to measure (e.g., obtain, convert, store) data related to the extension length of the piston beyond the supports of stroker actuator 402 (i.e., piston extension length 406). Non-limiting examples of distance sensor 410 include a linear potentiometer, linear encoder, linear variable differential transformer (LVDT), reflection-time-based emitter sensors (e.g., sonar, laser), and vision-based tracking (i.e., length markings on piston 404 that are identifiable by an optical sensor). Distance sensor 410 may be installed anywhere appropriate, for the type of sensor, to measure piston extension length 406. Piston extension length 406 may be indirectly calculated via the properties of other components of stroker actuator 402. As a non-limiting example, a motor (not shown) may be employed to control the pumping of hydraulic fluids or the collar of a screw piston. In such cases, the duration (i.e., elapsed time) the motor was in motion may be logged and, when combined with the speed of piston 404, the instantaneous piston extension length 406 may be calculated and/or approximated (e.g., via integration). Information handling system 200 may be employed to gather, store, analyze, display, manipulate and/or otherwise process any of the data obtained by distance sensor 410.

As shown in FIG. 4A, piston 404 may be fully retracted into stroker actuator 402, such that piston 404 cannot retract any further into stroker actuator 402. As shown in FIG. 4B, piston 404 may partially extend from stroker actuator 402 causing only a portion of piston 404 to be exposed. Piston extension length 406 is the length of the segment of the piston 404 extending outside of stroker actuator 402. Piston extension length 406 may be measured from the distal end exposed outside of stroker actuator 402 to the nearest support (e.g., at the opening of stroker actuator 402, a collar supporting piston 404). As shown in FIG. 4C, piston 404 may be fully (or mostly) extended from stroker actuator 402 such that piston extension length 406 is at its maximum.

Although not shown in FIGS. 4A-4C, stroker actuator 402 may be able to control piston extension length 406 to be any length between fully retracted (shown in FIG. 4A) or fully extended (shown in FIG. 4C). The partially extended piston 404 shown in FIG. 4B is just one example of many possible intermediate piston extension lengths 406.

FIG. 5

Figure 5:
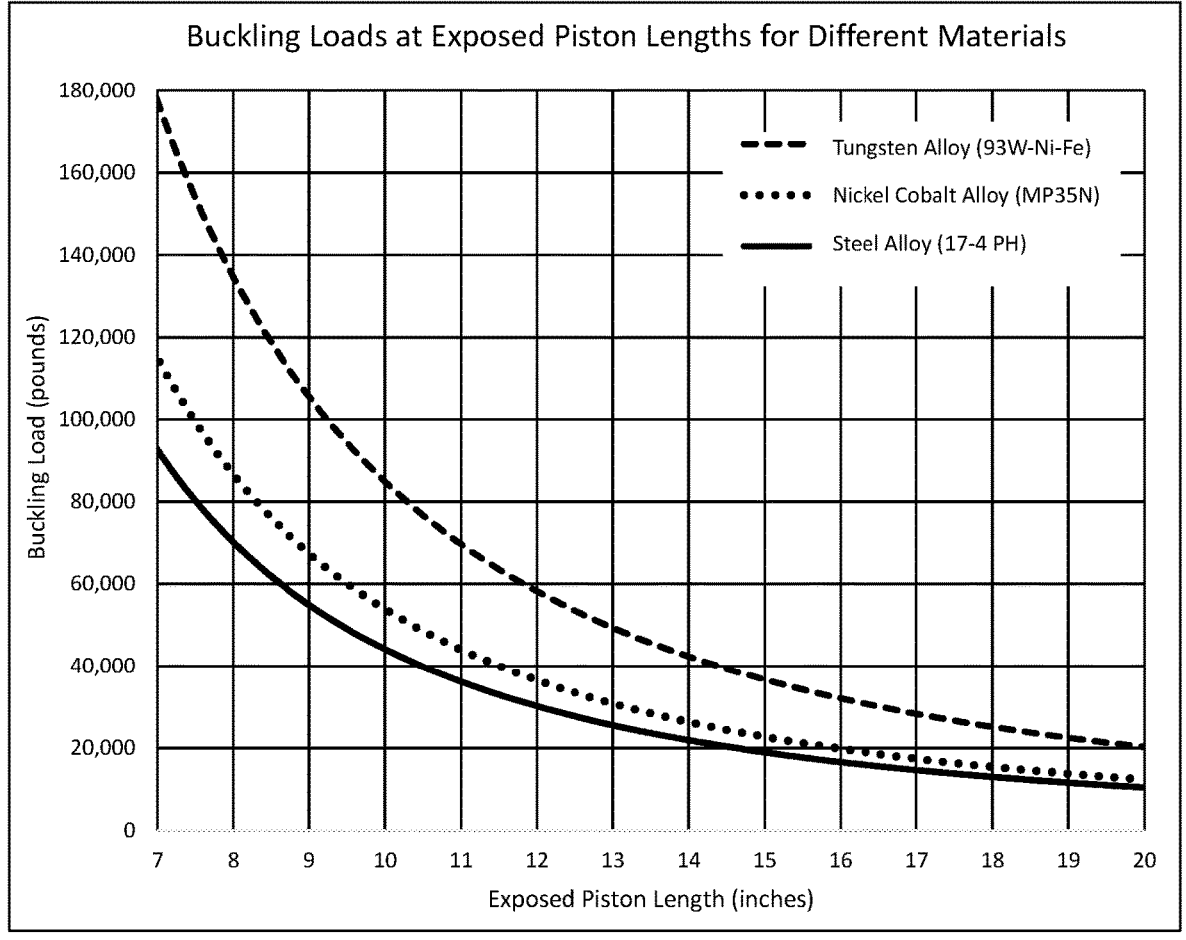
FIG. 5 is a graph showing the buckling forces of varying metals.

FIG. 5 is a graph showing the buckling forces (measured in pounds) for three different metals at varying piston extension lengths 406 (measured in inches), where each shaft would have the same diameter. A tungsten alloy (93 W—Ni—Fe) (dashed line) is shown as the uppermost plot on the graph, a nickel cobalt alloy (MP35N) (dotted line) is shown as the middle plot on the graph, and a steel alloy (17-4 PH) is shown as the lowermost plot on the graph.

As a non-limiting example, as shown in FIG. 5, a shaft made of a steel alloy (17-4 PH) may have a critical buckling load of (approximately) 10,000 pounds when piston extension length 406 is 20 inches. However, if piston extension length 406 is shortened to 15 inches (a 25% reduction), the buckling load doubles to (approximately) 20,000 pounds. As can be seen in FIG. 5, the buckling load increases exponentially as piston extension length 406 shortens (moving leftward on the horizontal axis). With a piston extension length 406 of only seven inches, the steel alloy may withstand approximately 90,000 pounds of force before buckling.

Similarly, as another non-limiting example, a nickel cobalt alloy (MP35N) may have a marginally higher buckling force (compared to the steel alloy) at 20 inches (approximately 12,000 pounds) of piston extension length 406. Whereas, at seven inches of piston extension length 406, the nickel cobalt alloy may withstand (approximately) 115,000 pounds of force before buckling.

As a third non-limiting example, a tungsten alloy (93 W—Ni—Fe) plot is illustrated, showing that the tungsten alloy may withstand (approximately) 20,000 pounds of force when piston extension length 406 is 20 inches and (approximately) 180,000 pounds of force when piston extension length 406 is only seven inches, before buckling.

FIG. 6

Figure 6:
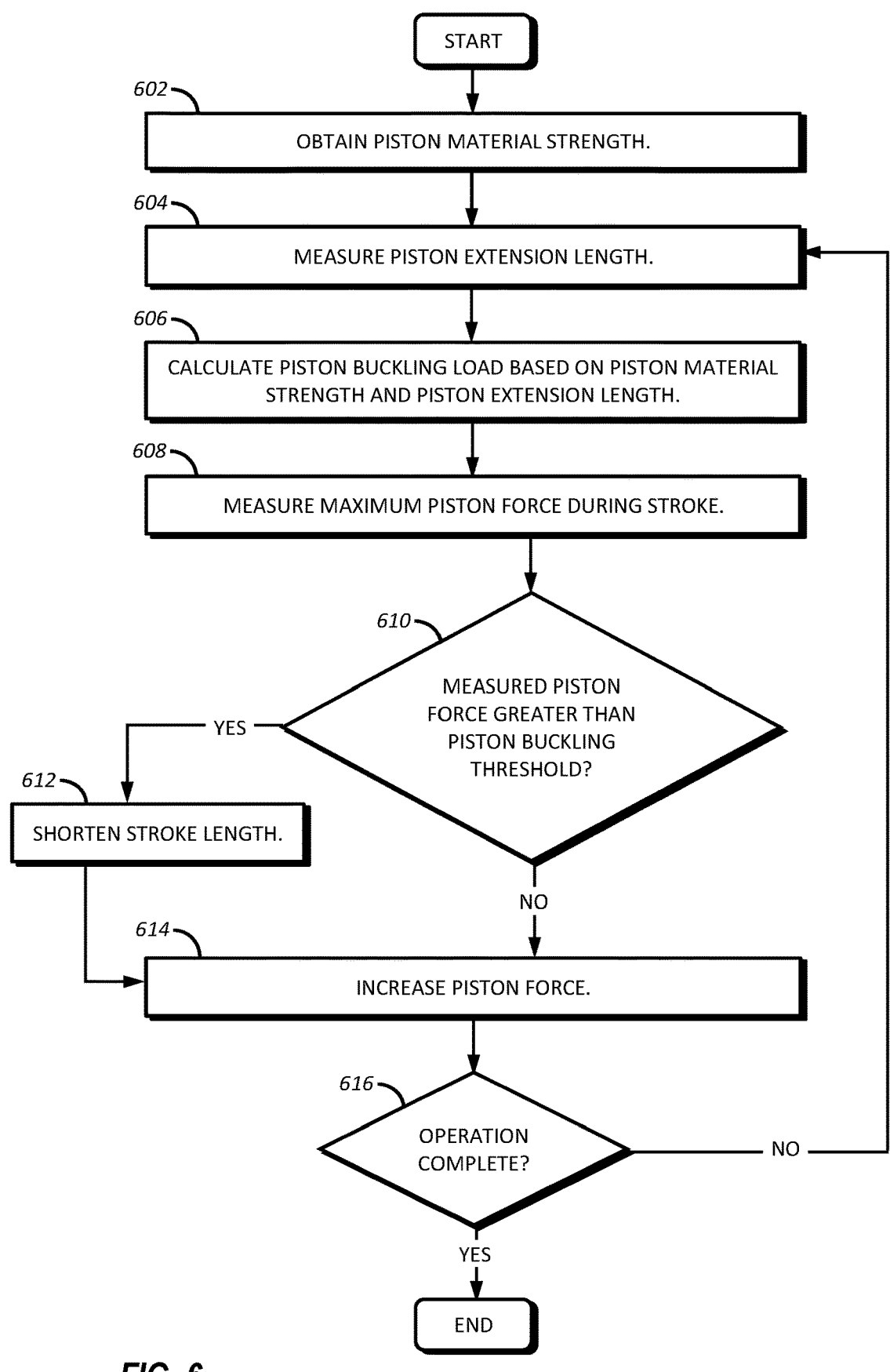
FIG. 6 is a flowchart of a method for dynamically controlling the length and forces applied to a stroker actua-tor.

FIG. 6 is a flowchart of a method for dynamically controlling a stroker actuator and/or the functions thereof (e.g., the piston extension length, the piston force). All or a portion of the method shown may be performed by one or more components of information handling system 200 (see description in FIGS. 2A and 2B) or a user thereof. While the various steps in this flowchart are presented and described sequentially, one of ordinary skill in the relevant art (having the benefit of this detailed description) would appreciate that some or all steps may be executed in different orders, combined, or omitted, and some or all steps may be executed in parallel.

In one or more embodiments, prior to and during the method described herein, stroker actuator 402 (see description in FIG. 4) may be continuously reciprocating piston 404 (repeatedly extending and retracting piston 404). The method described herein may be performed for each stroke (extension and retraction) of piston 404 or may be performed at less frequent intervals (e.g., every second stroke, every fifth stroke, etc.).

In block 602, information handling system 200 obtains the piston material strength. Information handling system 200 may obtain the piston material strength via user input. In turn, a user may obtain the piston material strength via published specifications (e.g., a data sheet) of the piston, known material properties of the piston, and/or any other source that provides the piston's material strength. The piston material strength may be input and stored as a numerical value with known units (e.g., 50,000 pounds-per-square-inch (psi), 350 megapascals (MPa)). In one or more embodiments, although not dimensionally accurate, the piston material "strength" may be provided and obtained in units of force (e.g., pounds, newtons) instead of units of pressure (e.g., psi, Pa) as the cross-sectional area of the piston is known and constant. Information handling system 200 stores the piston material strength value in a non-transitory computer readable medium.

In block 604, information handling system 200 measures piston extension length 406 at its longest during a stroke (i.e., piston's 404 greatest magnitude during the extension motion). In one or more embodiments, piston extension length 406 may be measured via distance sensor 410 and/or indirectly (e.g., via utilization, motor current/power). Piston extension length 406 may be measured and stored as a numerical value with known units (e.g., 5 inches, 40 centimeters, 1 foot, etc.). Information handling system 200 stores the piston material strength value in a non-transitory computer readable medium.

In block 606, information handling system 200 calculates the piston buckling load, based on the piston's material strength and piston extension length 406 (as measured in block 604). The formula used to calculate the piston buckling load may be based on theoretical formula(s), approximated equation(s) derived from empirical data, and/or any other calculation to determine, or approximate, the piston buckling load. The piston buckling load may be calculated and stored as a numerical value with known units (e.g., 40,000 pounds, 200,000 newtons (N), etc.). Information handling system 200 stores the piston material strength value in a non-transitory computer readable medium.

In block 608, information handling system 200 measures the maximum piston force during the stroke. The piston force may be measured directly via force sensor 408 and/or indirectly (e.g., via the actuator's control mechanism, motor current/power utilization). The maximum piston force during the piston's stroke may be when piston 404 is at its maximum piston extension length 406 during the stroke.

In block 610, information handling system 200 makes a determination as to whether the measured piston force is greater than a piston buckling threshold (e.g., the calculated piston buckling load minus some buffer). Information handling system 200 may convert either the piston force or piston buckling load to comparable units (i.e., the same units). As an example, if the piston material strength is provided in units of pressure, information handling system 200 may convert the value to force (e.g., by multiplying by the piston's cross-sectional area). The piston buckling threshold may be calculated by subtracting a buffer from the calculated piston buckling load to provide a lower threshold for which a measured piston force will be considered to exceed the piston buckling load. The piston buckling threshold may be percentage based (e.g., 95% of the calculated piston buckling load, having a 5% buffer) or a fixed offset (e.g., the calculated piston buckling minus 1,000 pounds, have a 1,000-pound buffer).

If information handling system 200 determines that the piston force is greater than the piston bucking threshold (block 610—YES), the method proceeds to block 612. Otherwise, if information handling system 200 determines that the piston force is not greater than (e.g., less than or equal to) the piston bucking threshold (block 610-NO), the method proceeds to block 614.

In block 612, information handling system 200 shortens the exposed length of piston 404 during a stroke of stroker actuator 402 (i.e., shortening the maximum piston extension length 406 during a stroke). Information handling system 200 may shorten the stroke length by controlling stroker actuator 402 to only extend piston 404 to a piston extension length 406 that will allow piston 404 to operate at the measured piston force (measured in block 608) without buckling.

In block 614, information handling system 200 increases the piston force exerted. If the method is proceeding directly from block 610, piston 404 can exert additional force, at the existing piston extension length 406, before piston 404 is at risk of buckling. Similarly, if the method is proceeding from block 612, the maximum stroke length of piston 404 has been shortened and therefore, piston 404 is able to exert a higher force at the shorter piston extension length 406. In either case, the piston force is below the buckling load threshold and piston 404 can therefore exert more force during the stroking motion.

In block 616, a determination is made as to whether the desired operation has been completed. Operations utilizing stroker actuator 402 may include opening or closing a valve, plugging a hole, clearing a mechanical blockage (e.g., dislodging a stuck tool), or any other tasks requiring repetitive linear forces of large magnitude. The determination as to whether the operation is complete may be made by information handling system 200 or a user of the system.

If information handling system 200 (or a user) determines that the operation is complete (block 616—YES), the method may end. Otherwise, if information handling system 200 (or a user) determines that the operation is not complete (block 616-NO), the method returns to block 604.

Solutions and Improvements

The methods and systems described above are an improvement over the current technology as the methods and systems described herein dynamically analyze and control a stroker actuator (an actuator on a drillstring) in order to prevent buckling of the actuator piston. Specifically, methods and systems described above dynamically calculate a maximum allowable force (before buckling) based on (i) the material strength of the piston, (ii) a measured (or calculated) force applied to the piston, and (iii) a measured (or calculated) length of the exposed portion of the piston (i.e., piston extension length). Thus, instead of a single maximum force limiting utilization of the actuator in all configurations, different maximum forces may be calculated (for a single actuator) based on intermediate extension lengths of the piston (i.e., when the piston is partially extended).

Systems herein (and methods performed by one or more components of a system) include, at least, a stroker actuator, comprising: a piston; and a motor to control a piston extension length and piston force of the piston; information handling system configured for: measuring piston extension length; calculating a piston buckling threshold based on piston extension length; measuring the piston force; making a determination that the piston force exceeds the piston buckling threshold; and based on the determination: shortening piston extension length.

Statements

The systems and methods may comprise any of the various features disclosed herein, comprising one or more of the following statements.

Statement 1. A method for controlling a stroker actuator, comprising: measuring a piston extension length; calculating a piston buckling threshold based on the piston extension length; measuring a piston force; making a determination that the piston force exceeds the piston buckling threshold; and based on the determination: shortening the piston extension length.

Statement 2. The method of statement 1, wherein prior to measuring the piston extension length, the method further comprises: obtaining a piston material strength.

Statement 3. The method of statement 2, wherein calculating the piston buckling threshold is further based on the piston material strength.

Statement 4. The method of statement 3, wherein calculating a piston buckling threshold comprises: calculating a piston buckling load based on the piston extension length and the piston material strength.

Statement 5. The method of statement 4, wherein calculating a piston buckling threshold further comprises: subtracting a buffer from the piston buckling load to obtain the piston buckling threshold.

Statement 6. The method of any previous statement 1 or 2, wherein measuring the piston extension length comprises: using a distance sensor to measure the piston extension length.

Statement 7. The method of any previous statement 1, 2, or 6, wherein measuring the piston extension length comprises: calculating the piston extension length using electrical current values of a motor of the stroker actuator.

Statement 8. The method of any previous statement 1, 2, 6, or 7, wherein measuring the piston force comprises: using a force sensor to measure the piston force.

Statement 9. The method of any previous statement 1, 2, 6, 7, or 8, wherein measuring the piston force comprises: calculating the piston force using electrical current values of a motor of the stroker actuator.

Statement 10. The method of any previous statement 1, 2, 6, 7, 8, or 9, wherein prior to measuring the piston extension length, the method further comprises: extending a piston, wherein the piston impacts an object while extending.

Statement 11. A system comprising: a stroker actuator, comprising: a piston; and a motor to control a piston extension length and piston force of the piston; an information handling system configured for: measuring the piston extension length; calculating a piston buckling threshold based on the piston extension length; measuring the piston force; making a determination that the piston force exceeds the piston buckling threshold; and based on the determination: shortening the piston extension length.

Statement 12. The system of statement 11, wherein prior to measuring the piston extension length, the information handling system is further configured for: obtaining a piston material strength.

Statement 13. The system of statement 12, wherein calculating the piston buckling threshold is further based on the piston material strength.

Statement 14. The system of statement 13, wherein calculating a piston buckling threshold comprises: calculating a piston buckling load based on the piston extension length and the piston material strength.

Statement 15. The system of statement 14, wherein calculating a piston buckling threshold further comprises: subtracting a buffer from the piston buckling load to obtain the piston buckling threshold.

Statement 16. The system of any previous statement 11 or 12, wherein measuring the piston extension length comprises: using a distance sensor to measure the piston extension length.

Statement 17. The system of any previous statement 11, 12 or 16, wherein measuring the piston extension length comprises: calculating the piston extension length using electrical current values of the motor of the stroker actuator.

Statement 18. The system of any previous statement 11, 12, 16, or 17, wherein measuring the piston force comprises: using a force sensor to measure the piston force.

Statement 19. The system of any previous statement 11, 12, 16, 17, or 18, wherein measuring the piston force comprises: calculating the piston force using electrical current values of the motor of the stroker actuator.

Statement 20. The system of any previous statement 11, 12, 16, 17, 18, or 19 wherein prior to measuring the piston extension length, the information handling system is further configured for: extending the piston, wherein the piston impacts an object while extending.

General Notes

As it is impracticable to disclose every conceivable embodiment of the technology described herein, the figures, examples, and description provided herein disclose only a limited number of potential embodiments. One of ordinary skill in the art would appreciate that any number of potential variations or modifications may be made to the explicitly disclosed embodiments, and that such alternative embodiments remain within the scope of the broader technology. Accordingly, the scope should be limited only by the attached claims. Further, the compositions and methods are described in terms of "comprising," "containing," or "including" various components or steps, the compositions and methods may also "consist essentially of" or "consist of" the various components and steps. Moreover, the indefinite articles "a" or "an," as used in the claims, are defined herein to mean one or more than one of the elements that it introduces. Certain technical details, known to those of ordinary skill in the art, may be omitted for brevity and to avoid cluttering the description of the novel aspects.

For further brevity, descriptions of similarly-named components may be omitted if a description of that similarly-named component exists elsewhere in the application. Accordingly, any component described with regard to a specific figure may be equivalent to one or more similarly-named components shown or described in any other figure, and each component incorporates the description of every similarly-named component provided in the application (unless explicitly noted otherwise). A description of any component is to be interpreted as an optional embodiment-which may be implemented in addition to, in conjunction with, or in place of an embodiment of a similarly-named component described for any other figure.

Lexicographical Notes

As used herein, adjective ordinal numbers (e.g., first, second, third, etc.) are used to distinguish between elements and do not create any particular ordering of the elements. As an example, a "first element" is distinct from a "second element", but the "first element" may come after (or before) the "second element" in an ordering of elements. Accordingly, an order of elements exists only if ordered terminology is expressly provided (e.g., "before", "between", "after", etc.) or a type of "order" is expressly provided (e.g., "chronological", "alphabetical", "by size", etc.). Further, use of ordinal numbers does not preclude the existence of other elements. As an example, a "table with a first leg and a second leg" is any table with two or more legs (e.g., two legs, five legs, thirteen legs, etc.). A maximum quantity of elements exists only if express language is used to limit the upper bound (e.g., "two or fewer", "exactly five", "nine to twenty", etc.). Similarly, singular use of an ordinal number does not imply the existence of another element. As an example, a "first threshold" may be the only threshold and therefore does not necessitate the existence of a "second threshold".

As used herein, the word "data" is used as an "uncountable" singular noun—not as the plural form of the singular noun "datum". Accordingly, throughout the application, "data" is generally paired with a singular verb (e.g., "the data is modified"). However, "data" is not redefined to mean a single bit of digital information. Rather, as used herein, "data" means any one or more bit(s) of digital information that are grouped together (physically or logically). Further, "data" may be used as a plural noun if context provides the existence of multiple "data" (e.g., "the two data are combined").

As used herein, the term "operative connection" (or "operatively connected") means the direct or indirect connection between devices that allows for interaction in some way (e.g., via the exchange of information). For example, the phrase 'operatively connected' may refer to a direct connection (e.g., a direct wired or wireless connection between devices) or an indirect connection (e.g., multiple wired and/or wireless connections between any number of other devices connecting the operatively connected devices).

What is claimed is:

1. A method for controlling a stroker actuator in a wellbore, comprising:
    measuring a piston extension length;
    calculating a piston buckling threshold based on the piston extension length;
    measuring a piston force;
    making a determination that the piston force exceeds the piston buckling threshold;

based on the determination:

shortening the piston extension length; and extending a piston, wherein the piston impacts an object while extending, wherein prior to the piston impacting the object, the piston is not contacting the object, and wherein when the piston impacts the object, the piston contacts the object.

2. The method of claim 1, wherein prior to measuring the piston extension length, the method further comprises:

obtaining a piston material strength.

3. The method of claim 2, wherein calculating the piston buckling threshold is further based on the piston material strength.

4. The method of claim 3, wherein calculating the piston buckling threshold comprises:

calculating a piston buckling load based on the piston extension length and the piston material strength.

5. The method of claim 4, wherein calculating the piston buckling threshold further comprises:

subtracting a buffer from the piston buckling load to obtain the piston buckling threshold.

6. The method of claim 1, wherein measuring the piston extension length comprises:

using a distance sensor to measure the piston extension length.

7. The method of claim 1, wherein measuring the piston extension length comprises:

calculating the piston extension length using electrical current values of a motor of the stroker actuator.

8. The method of claim 1, wherein measuring the piston force comprises:

using a force sensor to measure the piston force.

9. The method of claim 1, wherein measuring the piston force comprises:

calculating the piston force using electrical current values of a motor of the stroker actuator.

10. The method of claim 1, wherein after extending the piston, the method further comprises:

retracting the piston; and extending all the piston again, wherein the piston impacts the object while extending, wherein prior to the piston impacting the object, the piston is not contacting the object, and wherein when the piston impacts the object, the piston contacts the object.

11. A system comprising:

a stroker actuator, comprising:

a piston; and a motor to control a piston extension length and piston force of the piston; and an information handling system configured for:

measuring the piston extension length;

calculating a piston buckling threshold based on the piston extension length;

measuring the piston force;

making a determination that the piston force exceeds the piston buckling threshold; and based on the determination:

shortening the piston extension length; and extending the piston, wherein the piston impacts an object while extending, wherein prior to the piston impacting the object, the piston is not contacting the object, and wherein when the piston impacts the object, the piston contacts the object.

12. The system of claim 11, wherein prior to measuring the piston extension length, the information handling system is further configured for:

obtaining a piston material strength.

13. The system of claim 12, wherein calculating the piston buckling threshold is further based on the piston material strength.

14. The system of claim 13, wherein calculating the piston buckling threshold comprises:

calculating a piston buckling load based on the piston extension length and the piston material strength.

15. The system of claim 14, wherein calculating the piston buckling threshold further comprises:

subtracting a buffer from the piston buckling load to obtain the piston buckling threshold.

16. The system of claim 11, wherein measuring the piston extension length comprises:

using a distance sensor to measure the piston extension length.

17. The system of claim 11, wherein measuring the piston extension length comprises:

calculating the piston extension length using electrical current values of the motor of the stroker actuator.

18. The system of claim 11, wherein measuring the piston force comprises:

using a force sensor to measure the piston force.

19. The system of claim 11, wherein measuring the piston force comprises:

calculating the piston force using electrical current values of the motor of the stroker actuator.

20. The system of claim 11, wherein after extending the piston, the information handling system is further configured for:

retracting the piston; and extending the piston again, wherein the piston impacts the object while extending, wherein prior to the piston impacting the object, the piston is not contacting the object, and wherein when the piston impacts the object, the piston contacts the object.

\* \* \* \* \*